(12) United States Patent
Holemans (10) Patent No.: US 8,973,511 B2
(45) Date of Patent: Mar. 10, 2015

(54) AUTONOMOUS SAILBOAT FOR OCEANOGRAPHIC MONITORING

(71) Applicant: Walter Holemans, Washington, DC (US)

(72) Inventor: Walter Holemans, Washington, DC (US)

( * ) Notice: Subject to any disclaimer, the term of this patent is extended or adjusted under 35 U.S.C. 154(b) by 139 days.

(21) Appl. No.: 13/845,488

(22) Filed: Mar. 18, 2013

(65) Prior Publication Data

US 2014/0116311 A1 May 1, 2014

Related U.S. Application Data

(60) Provisional application No. 61/616,044, filed on Mar. 27, 2012.

(51) Int. Cl.
| | | |
|---|---|---|
| *B63B 1/00* | (2006.01) | |
| *B63C 7/00* | (2006.01) | |
| *B63B 35/00* | (2006.01) | |
| *B63H 9/06* | (2006.01) | |
| *B63B 1/12* | (2006.01) | |
| *B63B 15/00* | (2006.01) | |
| *B63J 3/04* | (2006.01) | |
| *B63B 41/00* | (2006.01) | |
| *B63B 43/10* | (2006.01) | |
| *B63H 5/07* | (2006.01) | |
| *B63B 39/06* | (2006.01) | |
| *B63J 3/00* | (2006.01) | |
| *B63J 99/00* | (2009.01) | |

(52) U.S. Cl.
CPC .................. *B63C 7/003* (2013.01); *B63B 35/00* (2013.01); *B63H 9/0607* (2013.01); *B63B 1/12* (2013.01); *B63B 15/0083* (2013.01); *B63J 3/04* (2013.01); *B63B 41/00* (2013.01); *B63B 43/10* (2013.01); *B63H 5/07* (2013.01); *B63B 2035/007* (2013.01); *B63B 2039/065* (2013.01); *B63B 2203/00* (2013.01); *B63B 2211/02* (2013.01); *B63H 2009/0628* (2013.01); *B63J 2003/003* (2013.01); *B63J 2003/046* (2013.01); *B63J 2099/008* (2013.01); *Y02T 70/70* (2013.01)
USPC .................... 114/61.11; 114/39.23; 114/39.26

(58) Field of Classification Search
USPC ........................................ 114/39.23–29, 61.11
See application file for complete search history.

(56) References Cited

U.S. PATENT DOCUMENTS

| | | | | | |
|---|---|---|---|---|---|
| 3,865,061 | A | * | 2/1975 | Newman | 114/39.23 |
| 3,885,512 | A | * | 5/1975 | Marcil | 114/39.26 |
| 3,972,300 | A | * | 8/1976 | Adamski | 114/39.32 |
| 3,986,473 | A | * | 10/1976 | Truzzi | 114/39.22 |
| 4,102,287 | A | * | 7/1978 | Ferris | 114/39.23 |
| 4,432,298 | A | * | 2/1984 | Cudmore | 114/39.24 |
| 4,437,424 | A | * | 3/1984 | Lord | 114/91 |
| 4,516,518 | A | * | 5/1985 | Cate | 114/39.23 |

(Continued)

*Primary Examiner* — Lars A Olson
*Assistant Examiner* — Jovon Hayes
(74) *Attorney, Agent, or Firm* — Douglas C. Wyatt (57) ABSTRACT

A fleet of autonomous sailing vessels that are equipped with monitoring and communication equipment for reporting environmental and other conditions. For optimal stability, the autonomous sailing vessels are multi-hulled vessels (catamarans) with self-righting capabilities. Each sailing vessel sends and receives information via one or more satellite links, using solar power to power the communications equipment as well as the monitoring equipment. Each sailing vessel includes an auto-sailtrim system to maintain a desired attack angle with the wind, and electric propulsion for use as required to maintain a desired heading. A modular design is used to support mission-specific payloads.

30 Claims, 6 Drawing Sheets

(56) References Cited

U.S. PATENT DOCUMENTS

| | | | |
|---|---|---|---|
| 4,610,212 A * | 9/1986 | Petrovich | 114/39.26 |
| 4,788,924 A * | 12/1988 | Hamel | 114/102.21 |
| 4,972,789 A * | 11/1990 | Greppi | 114/90 |
| 5,076,186 A * | 12/1991 | Girard | 114/39.29 |
| 5,280,760 A * | 1/1994 | Edwards | 114/39.15 |
| 5,622,131 A * | 4/1997 | Walker | 114/102.29 |
| 5,908,005 A * | 6/1999 | Everett | 114/91 |
| 6,016,759 A * | 1/2000 | Russell | 114/39.21 |
| 6,216,621 B1 * | 4/2001 | Russell | 114/39.21 |
| 6,341,571 B1 * | 1/2002 | Russell et al. | 114/39.21 |
| 6,732,670 B2 * | 5/2004 | Rayner | 114/39.21 |
| 6,789,489 B1 * | 9/2004 | Phipps | 114/39.24 |
| 6,923,131 B2 * | 8/2005 | Petrovich | 114/39.26 |
| 7,047,902 B1 * | 5/2006 | Little | 114/361 |
| 2014/0116311 A1 * | 5/2014 | Holemans | 114/39.23 |

* cited by examiner

AUTONOMOUS SAILBOAT FOR OCEANOGRAPHIC MONITORING

This application claims the benefit of U.S. Provisional Patent Application 61/616,044, filed 27 Mar. 2012.

BACKGROUND AND SUMMARY OF THE INVENTION

This invention relates to the field of autonomous sailing vessels, and in particular to a low-cost, highly-efficient, and highly-robust sailboat that includes monitoring and communication equipment for monitoring and reporting environmental and other conditions.

The world's oceans are among the most difficult and expensive regions to monitor, due in part to the size of the area encompassed by the oceans and the time and resources required to reach remote areas. It is estimated that it would cost about $10-100K per day to provide a manned monitoring vessel in a remote area, such as the South Pacific. Accordingly, very little oceanographic monitoring is actually performed. In like manner, aerial reconnaissance can be very expensive, and very limited in terms of the range and area that can be monitored during each flight. Manned monitoring vessels or aircraft are also subject to adverse weather conditions, which may limit the times that the monitoring may be conducted, or may place the monitoring personnel at increased risk. Satellite imaging provides some information regarding the condition on the surface and above the ocean, but is substantially limited with regard to conditions under the ocean surface.

There is an increasing need to provide more detailed oceanographic monitoring. Concerns abound, for example, regarding increasing levels of hydrocarbons and other materials that are harmful to marine life. In coastal areas, nitrogen runoff from fertilized lands is particularly of concern. The monitoring of fish in particular habitats may provide an early-warning of increasing mortality or decreasing birth rate. In like manner, in the event of an environmental disaster, such as the Gulf oil spill, an accurate monitoring of the extent of the effects of the disaster can aid rescue and repair operations.

Beyond environmental concerns, the increase in pirate activities in certain areas of the world is of concern, as well as the increase in drug trafficking via the seas. Manned surveillance is limited in range and area, and in some cases, dangerous to the surveillance crew.

In addition to addressing particular concerns, the monitoring of oceanographic conditions may enhance our ability to forecast storms and tsunamis, and may enhance marine safety by warning vessels of particularly hazardous conditions. In some cases, the availability of remote monitors on the seas in a region may enhance search and rescue operations in that region.

It would be advantageous to provide an affordable means for increasing oceanographic monitoring. It would also be advantageous to be able to provide this increased oceanographic monitoring without requiring personnel at the sites being monitored. It would also be advantageous to provide a reliable and robust monitoring capability with a high likelihood of survivability in hazardous conditions.

These advantages, and others, can be realized by a fleet of autonomous sailing vessels that are equipped with monitoring and communication equipment for reporting environmental and other conditions. For optimal stability and speed, the autonomous sailing vessels are multi-hulled vessels (catamarans) with self-righting capabilities. Each sailing vessel sends and receives information via one or more satellite links, using solar power to power the communications equipment as well as the monitoring equipment. Each sailing vessel includes an auto-sailtrim system to maintain a desired attack angle with the wind ('angle of attack'), and electric propulsion for use as required when sufficient electric power is available. A modular design is used to support mission-specific payloads.

In an example embodiment, the sailboat comprises a plurality of hulls arranged parallel to each other and coupled together by a truss arrangement, a wingsail structure that is rotatable about a first axis of rotation that is orthogonal to a plane of the hulls, and a second axis of rotation that is parallel to the hulls, and an auto-righting system that is configured to rotate the wingsail structure about the second axis of rotation when a capsize of the sailboat is detected.

The righting of the capsized sailboat may be performed by rotating a buoyant mast structure about an axis that is parallel to a surface of the body of water, so as to move the center of buoyancy of the capsized sailboat beyond a center of gravity of the capsized sailboat.

In another example embodiment, the sailboat comprises a plurality of hulls arranged parallel to each other and coupled together by a truss arrangement, a wingsail structure that is rotatable about a first axis of rotation that is orthogonal to a plane of the hulls, and an autotrim system that controls rotation of the wingsail structure about the first axis of rotation. The wingsail structure includes a wingsail that provides lift to propel the sailboat forward, a wind vane that pivots on the wingsail structure so as to consistently be aligned with a current wind direction, and a coupling rod that controls a difference between an orientation of the wingsail structure and an orientation of the wind vane. The autotrim system includes a cam that is attached to the truss arrangement and coupled to the coupling rod to control the difference between the orientation of the wingsail structure and the orientation of the wind vane based on an orientation of the truss structure.

The self-trimming may be performed by coupling the wingsail structure and the windvane structure via a cam that controls the angle of attack of the wingsail based on the direction of wind indicated by the windvane structure.

BRIEF DESCRIPTION OF THE DRAWINGS

The invention is explained in further detail, and by way of example, with reference to the accompanying drawings wherein:

FIGS. 3A-3I illustrate an example autonomous sailboat with self-righting capability.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
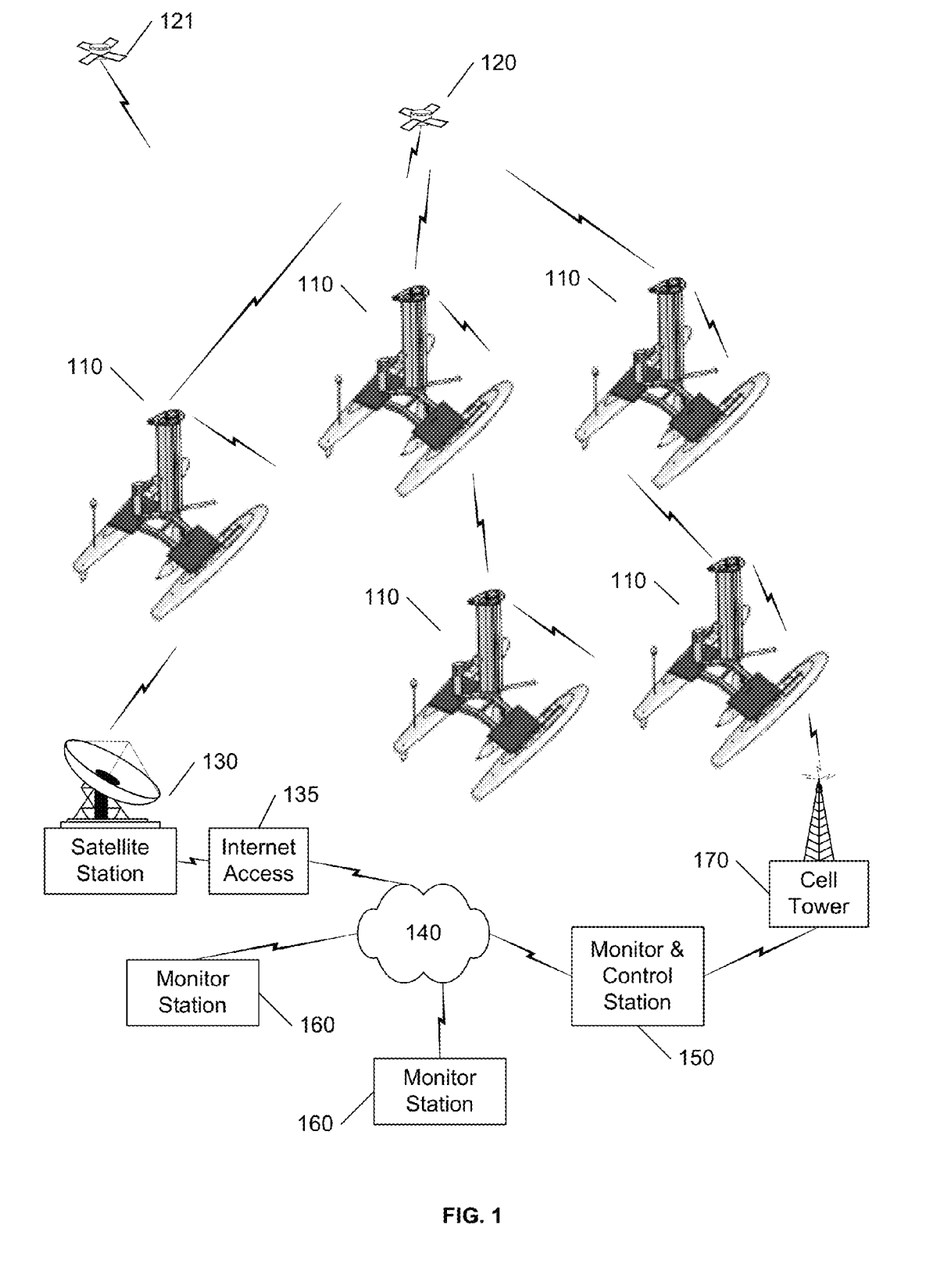
FIG. 1 illustrates an example concept sketch of a fleet of autonomous sailing vessels that communicate to a user via satellite and internet connections.

FIG. 1 illustrates an example concept sketch of a fleet of autonomous sailing vessels that communicate to a user via satellite and internet connections. In a typical embodiment, the provider of the fleet will configure the vessels based on a particular customer's requirements for mission-specific monitoring tasks. The fleet's movements are controlled by the provider of the fleet, based on directives from the customer, and the collection of mission-specific information may be controlled, at least in part, by the customer.

The fleet of vessels 110 are deployed to a region to be monitored, and are in communication with a monitor and control station 150 for receiving control information and transmitting monitor and other information. Typically, communication with each vessel will be via satellite communication system 120-130, although other forms of communication may be used. For example, in missions that are in proximity of a coast, communications may be provided via cellular networks, using on-shore cell towers 170.

Optionally, different communication systems may be used for different applications. For example, navigation information may be communicated via one system, and monitoring information may be communicated via another system.

A monitoring and control system 150 communicates control information to the fleet of vessels and receives feedback information from the vessels, via, for example, the Internet network 140. Other monitoring systems 160 may receive monitored information from the vessels, and may optionally be configured to control particular monitoring equipment.

Depending upon the communication system used, the messages will provide destination information. For example, if the Internet network 140 is used, the messages will communicate a destination URL address, or set of addresses, to deliver the message to an internet interface 135 between the satellite communication system 120-130 and the Internet 140. If a cellular network is used. The messages may be text messages that are addressed to one or more destinations.

In an example embodiment of the command communication system, each vessel may have an individual communication address, and the fleet may have a fleet communication address, allowing for control of the fleet as a whole, as well as control of individual vessels within the fleet. The control will generally be in the form of navigation commands and monitoring commands. The structure of the commands will be dependent upon the capabilities provided in the vessels 110. For example, if the vessels 110 include navigational software, the control station 150 may only need to communicate a target location (e.g. latitude, longitude) and the vessels 110 may determine the direction to travel and the vessel commands (e.g. rudder control) to proceed in that direction. In other embodiments, the control station 150 may communicate the direction to travel, and the vessels 110 determine the vessel commands; or, the control station 150 may communicate the vessel commands to each vessel 110. The command structure may range from basic vessel commands to the highest supported navigation commands, allowing the operator at the control station 150 to exercise situation-dependent control of the fleet and individual vessels within the fleet.

Each vessel preferably includes a navigation monitor for providing location and tracking information, such as a GPS system that provides the vessel's current location and the speed and direction of travel. This information will generally be communicated to the control station 150, as well as being used by a control system within the vessel to facilitate vessel control. For example, the tracking information may be used to control the path of the vessel to achieve an optimal "velocity made good" (VMG) toward the target area based on the current wind conditions, including traveling on different "tacks" (directions relative to the wind) to achieve an overall optimal speed in direction of the target ("tacking" to the target).

Each vessel also includes a variety of monitoring equipment; in some applications different vessels may be outfitted with different monitoring equipment. The vessel monitoring equipment will generally include, for example, the aforementioned GPS (Global Positioning System), inertial measurement units (IMUs), temperature sensors, and wind direction and speed sensors, and may include cameras and hull-speed sensors.

The mission-specific monitoring equipment may include video and infrared cameras, scanners, acoustic sensors and hydrophones, conductivity sensors, oxygen and other gas sensors, barometers, opto-fluidic water quality sensors, hydrocarbon detectors, Geiger counters, salinity and pH sensors, pressure sensors, and so on. The monitored information may be communicated to the monitoring systems 150, 160 continuously, periodically, on demand, or when triggered. The triggering may be based on changes of monitored values, changes of location, and so on. As noted, the mission-specific monitored information may be provided to one or more monitoring systems 160, and these systems may control some or all of the monitoring equipment.

It is significant to note that when the vessels are deployed as a fleet, measurements within an area can be obtained from vessels at different locations within the area. Such multiple measurements may allow for determining a location of a detected object via common location determining techniques, such as triangulation based on a determined range, direction, or orientation of the detected object from the different vessels.

It is also significant to note that although a relatively random positioning of vessels within a given target area may commonly be used, other deployment schemes may be used, such as a controlled positioning of each vessel to assure that each point within the target area is within the monitoring range of at least one vessel, or a positioning of all of the vessels in a given pattern, such as a picket line, to assure that all objects approaching or crossing the picket line are detected. One of skill in the art will recognize that the location of a vessel may be controlled to be within a defined area by traveling (tacking) back and forth within the area, thus allowing, for example, the establishment of a picket line across the entrance to a particular waterway, with each vessel having an assigned area along the picket line.

Figures 2A, 2B:
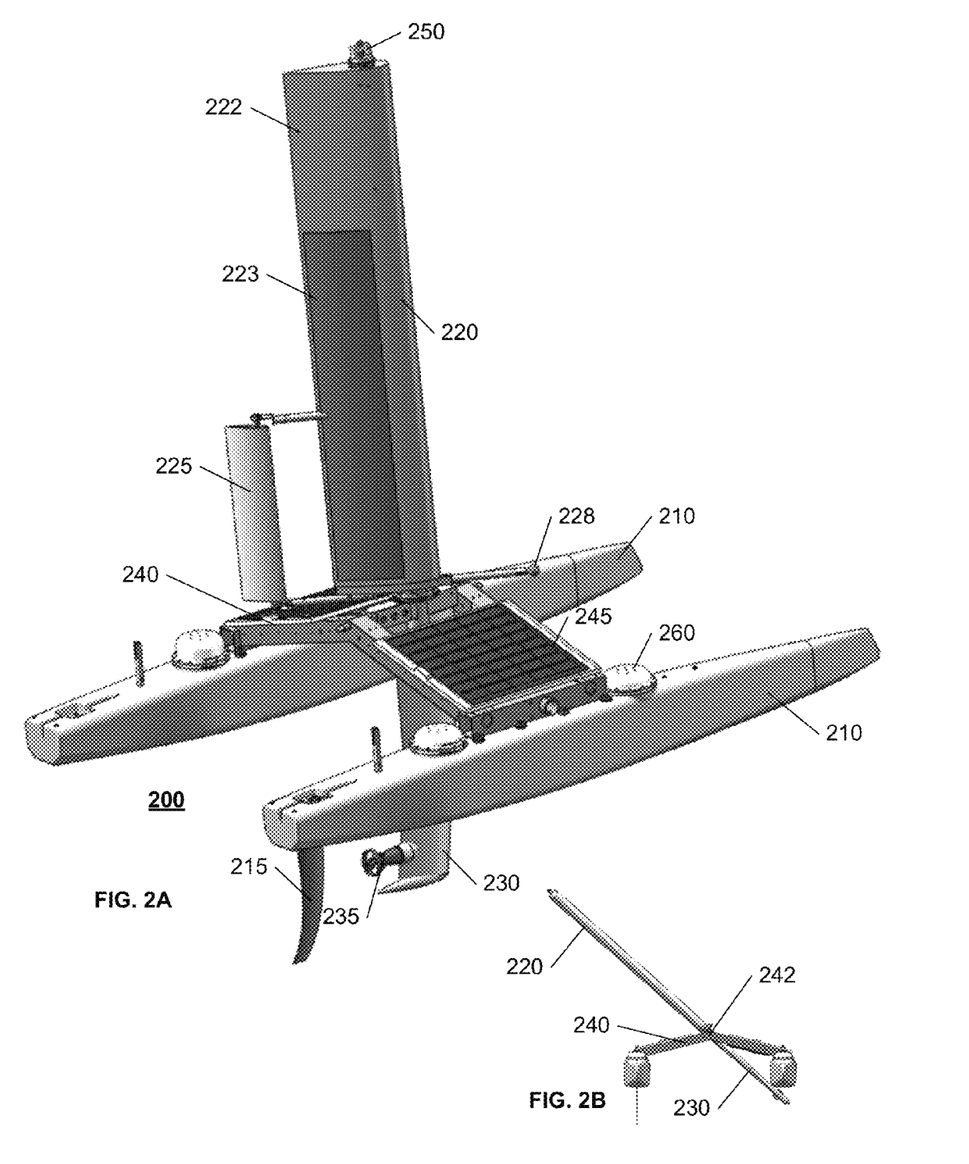
FIGS. 2A-2B illustrate an example autonomous sailboat in accordance with aspects of this invention.

FIGS. 2A-2B illustrate an example autonomous sailboat 200 in accordance with aspects of this invention. Preferably, the sailboat 200 is relatively small and light, so as not to pose a threat to other vessel in the event of a collision. The example sailboat 200 has a length of about 8 feet, a beam of about 6 feet, and a weight of about 200 pounds, and is equipped with red, green, and white running lights (not illustrated) for optional use at night, particularly in high traffic areas.

The sailboat 200 is a catamaran that includes two wave-piercing hulls 210 coupled together via a truss structure 240, upon which a mast (not visible) with a rotatable sail-wing structure 220 is mounted. The truss structure 240 also supports a keel 230, with an auxiliary propulsion device 235. At least one of the hulls 210 includes a rudder 215.

The sail wing structure 220 includes a sail-wing 222, a wind-vane 225, and a counter-balance 228 that allows the sail wing structure 220 to be rotated about the mast with minimal effort. In an example embodiment, the counter balance 228 causes the center of mass of the rotating parts to be coincident with the centerline of the rotary bearings and the center of lift of the sail wing The sailboat 200 includes communication and other monitoring equipment 250 at the top of the mast, and water-tight compartments 260 within which additional equipment may be configured. Solar panels 223, 245 are mounted on the wingsail 220 and truss 240 structures and provide the energy required to power the propulsion device 235 as well as the on-board communication, control, and monitoring systems. Optionally, the propulsion device 235 may be configured to generate electricity while the sailboat 200 travels under sail.

The example sailboat 200 includes four compartments 260; in a typical configuration, one of the compartments includes the navigation and communication control systems and battery storage, and the remaining three compartments are available for mission-specific payload systems. The keel 230 is also configured to contain monitoring devices (not illustrated) for surface and underwater monitoring. The hulls 210 and truss structure 240 may also be configured to contain other monitoring devices, depending upon the particular mission.

As illustrated in FIG. 2B, the wingsail structure 220 and keel 230 are rotatable about an axle 242 on the truss structure 240 that runs parallel to the hulls 210. As contrast to the rotation of the wingsail structure about the mast that extends above the truss structure, the rotation of the wingsail structure 220 on the axle 242 results in a rotation about an axis of rotation that is parallel to the hulls 210, whereas the rotation of the wingsail structure 220 about the mast results in a rotation about an axis that is orthogonal to a plane of the hulls 210.

In this example embodiment, the wingsail structure 220 and keel 230 are rigidly coupled together, so that a single actuator (not illustrated) may be used to rotate the combination about the axle 242. Optionally, dual activators could be used to independently control the rotation of the wingsail structure 220 and the keel 230.

In the example embodiment, the center of mass of the wingsail structure 220 and keel 230 arrangement is well above the center of rotation, axle 242. Accordingly, the rotatable keel 230 can be positioned to stabilize the sailboat in high wind conditions by rotating the wingsail structure 220 toward the wind, thereby moving the center of gravity of the sailboat toward the windward hull, reducing the likelihood of the windward hull lifting out of the water ('flying a hull').

In an embodiment with a lower center of mass of the rotating structure 220-230, the wingsail structure 220 may be rotated away from the wind to reduce the effective sail area presented to the wind, similarly reducing the likelihood of the windward hull lifting out of the water.

The rotatable keel also allows the draft of the sailboat 200 to be reduced, allowing the sailboat 200 to travel in shallow waters. The rotatable wingsail structure 220 allows the sailboat 200 to optionally tilt the wingsail to point its solar panels 223 toward the sun, or avoid shading the solar panels 245 on the truss structure 240. Tilting the wingsail structure 220 also reduces the ability to observe the sailboat 200, which may be advantageous in clandestine missions. The rotatable wingsail structure 220 also enables righting the sailboat 200 after a capsize, as detailed further below.

FIGS. 3A-3I illustrate the self-righting capability of the example sailboat 200, using the rotatable wingsail structure 220. In this example, the wingsail structure 220 is rigidly attached to the keel 230, such that a single actuator rotates both of these elements 220, 230 about the axle 242. As noted above, independent rotation of the wingsail structure 220 and the keel 230 may be provided.

Figure 3A:
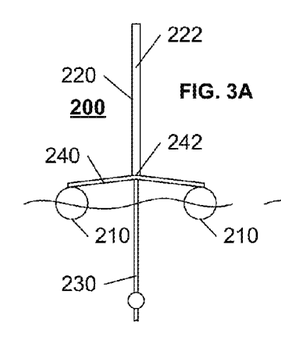
Figure 3B:
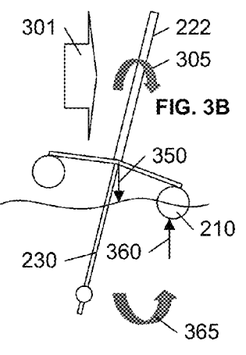

FIG. 3A illustrates a stable orientation of the sailboat 200; in this orientation, the center of gravity and center of buoyancy of the sailboat 200 are approximately located at the center of the sailboat 200. In FIG. 3B, the force of a wind 301 on the wingsail introduces a torque 305 that causes the sailboat to tilt (heel) away from the wind, lifting the left hull from the water and moving the center of gravity 350 slightly to the right, while the center of buoyancy 360 moves to the right hull 220, causing a resultant torque 365 in the counter-clockwise direction, serving to oppose the force of the wind 301 and tending to restore the sailboat to the stable position of FIG. 3A.

Figure 3C:
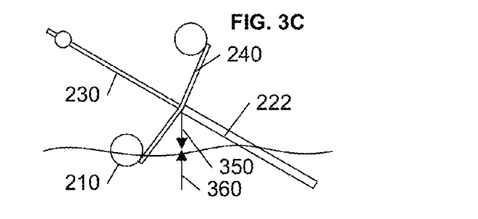

If the force of the wind 301 is excessive, the sailboat will tilt further, moving the center of gravity 350 further to the right, reducing the torque 365. When the torque 305 caused by the wind exceeds the torque 365, the resultant torque will be in the clockwise direction, causing the sailboat to capsize, as illustrated in FIG. 3C. Because the wingsail 222 is buoyant, typically being a sealed hollow or foam structure, the capsized sailboat 200 does not completely flip over. Optionally, a flotation bulb (not illustrated) may be affixed to the top of the wingsail 222, which will further increase the buoyancy of the wingsail 222. This flotation bulb may also serve to provide a watertight environment for the equipment 250 of FIG. 2A at the top of the mast.

Unfortunately, even though the sailboat is not completely flipped over, the capsized sailboat of FIG. 3C is in a stable position, because the center of gravity 350 is once again coincident with the center of buoyancy 360 (between the right hull and the top of the wingsail 222), The sailboat will remain in this position indefinitely unless a sufficient counter-clockwise righting force/torque is applied to get the sailboat out of the stable position of FIG. 3C and into the stable position of FIG. 3A.

Figures 3D, 3E, 3F, 3G:
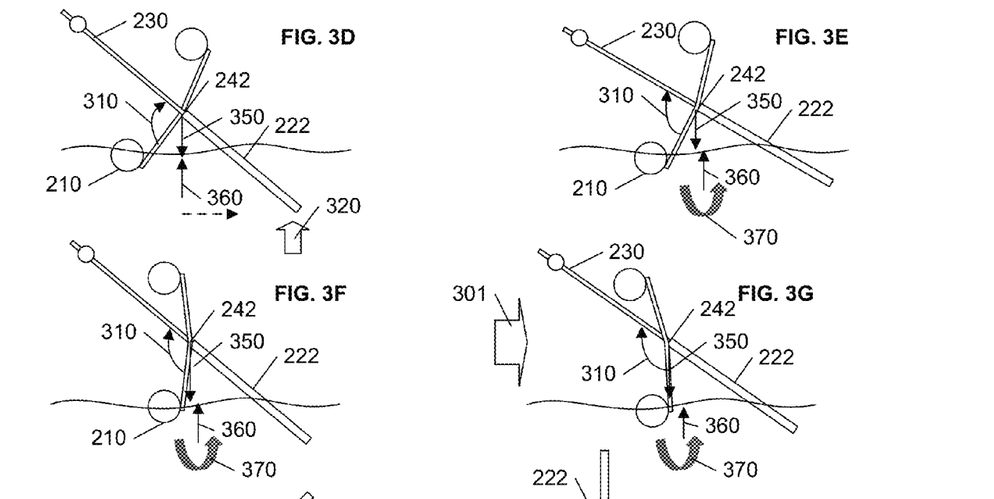

As noted above, the sailboat 200 includes a rotatable wingsail 222 and keel 230. Upon detecting a capsize, a motor is enabled to rotate the wingsail; in this case, the desired rotation 310 is in the clockwise direction, as illustrated in FIG. 3D. As the wingsail 222 is rotated about the axle 242 in a clockwise direction, the rotation attempts to sink the wingsail 222 further into the water. Due to the buoyancy of the wingsail 222, this attempt to sink the wingsail 222 further into the water initiates a movement of the center of buoyancy 360 to the right, introducing a righting torque 370, as illustrated in FIG. 3E. This rotation of the wingsail 222 also initiates a movement of the center of gravity 350 to the left, further increasing the righting torque.

Depending upon the structural arrangement of the wingsail 222 and the other elements of the sailboat, the wingsail 222 may also be rotated about an axis of rotation coincident with the mast of the sailboat to a 'neutral' position, to avoid damage as the wingsail 222 is rotated about the axle 242.

As the wingsail 222 and keel 230 are further rotated 310 clockwise about the axle 242, the sailboat is further rotated counter-clockwise, moving the center of buoyancy 360 further to the right, and the center of gravity 350 to the left, increasing the torque 370, as illustrated in FIGS. 3F-3G.

At some point, as illustrated in FIG. 3G, a continued counter-clockwise rotation 310 causes the center of gravity 350 of the sailboat to move further to the left of the center of buoyancy 360, further increasing the counter-clockwise torque 370. When this torque 370 is sufficient to overcome the force of the wind 301 on the underside of the sailboat, the sailboat will continue to rotate counter-clockwise until the left hull reaches the surface, as illustrated in FIG. 3H. In this position, the centers of gravity and buoyance of the sailboat are approximately aligned, and the tilt of the wingsail 222 presents a reduced effective surface area to the wind 301, reducing the likelihood of another capsize.

When the wind subsides, the wingsail structure 220 and keel 230 may be rotated in the counter-clockwise direction 315, returning the sailboat to the stable orientation of FIG. 3I, which is also the orientation of the original stable orientation of FIG. 3A. Thus, by rotating the wingsail structure 220 about the axle 242 after a capsize, the sailboat 200 will be self-righted.

The aforementioned control system of the sailboat 200 is configured to monitor the vertical orientation (heeling angle) of the sailboat 200, and to initiate the rotation of the wingsail structure 220 and keel 230 when a capsize is detected. Optionally, the rotation of the wingsail structure 220 and keel 230 may be initiated when the heeling angle exceeds a given threshold angle, to reduce the wingsail's effective surface area presented to the wind, and to move the center of gravity toward the windward hull (assuming that the CG of the rotatable components is above the center of rotation (242), thereby reducing the heeling effects of the wind, and reducing the likelihood of a capsize.

The example autonomous sailboat 200 also includes the ability to autonomously adjust the sail-trim based on the wind direction relative to the sailboat's direction of travel. As is known in the art of sailing, to achieve optimal speed, a sail is trimmed/adjusted to present a preferred angle of attack to the wind to maximize lift (the forward force exerted on the sail by the wind). As the wind direction changes with respect to the direction of travel of the sailboat, the sail should be trimmed to accommodate this change in wind direction. In like manner, when the sailboat changes its course, the direction of the wind relative to the new direction of travel is changed, and the sail should be trimmed to accommodate this change in course.

Although the sailboat may be configured to allow for manual/remote sail-trim, a self-trim capability substantially reduces the control complexity, and, if the self-trim capability is purely mechanical, substantially reduces the amount of energy needed to provide the appropriate sail-trim. In a preferred embodiment of the autonomous sailboat 200, the direction of travel is controlled by controlling the rudder to orient the sailboat in the desired direction, and the sail-trim required to propel the sailboat in the desired direction is controlled automatically. If the sail cannot achieve sufficient lift with the current course heading and current wind conditions, the auxiliary propulsion system 235 may be activated, or the course heading may be changed to provide a more efficient relative wind direction (commonly termed 'tacking' along alternating course headings to achieve the desired direction of travel).

FIGS. 4A-4E illustrate an example auto-sail-trim configuration for the example sailboat 200, using a view of the sailboat 200 from above. The wingsail structure 220 includes the wingsail 222, the wind vane 225, and the balance arm 228. The wingsail structure 220 freely rotates about the mast 410, which is rigidly coupled to the truss 440 between the hulls 210. In this example, the truss 440 is illustrated as a simple beam between the hulls 210, for ease of illustration. As illustrated in FIG. 2A, the actual truss structure 240 may include multiple trusses that support such items as solar panels 245.

In this disclosure, for ease of reference, the terms "direction of travel" of the sailboat and "orientation" of the sailboat (i.e. the direction that the sailboat is pointed) are used interchangeably, because, except for potential drift, the direction of travel of the sailboat is generally determined by the orientation of the sailboat when the sailboat is traveling forward.

Also for ease of reference and understanding, a distinction is not explicitly made herein between "actual wind" and "apparent wind". As is known in the art, to an observer on a moving sailboat, or to an object on the sailboat, such as a wingsail, the apparent wind is a combination of the actual wind and the velocity of the sailboat. For example, if a sailboat is traveling at 4 knots directly into a wind of 5 knots, the apparent wind is 9 knots from forward of the sailboat. If the sailboat is traveling at 4 knots with a wind of 5 knots from behind the boat, the apparent wind is 1 knot from behind the boat. If the sailboat is traveling at a non-zero angle to the wind, the apparent wind will be the vector difference between the wind velocity and the boat velocity. The forces produced by the wind traveling over the surfaces of the wingsail are dependent upon the apparent wind; in this disclosure, the terms relative wind direction, or the wind direction relative to the orientation or direction of travel of the sailboat, may be considered to be the apparent wind direction.

Figure 4A:
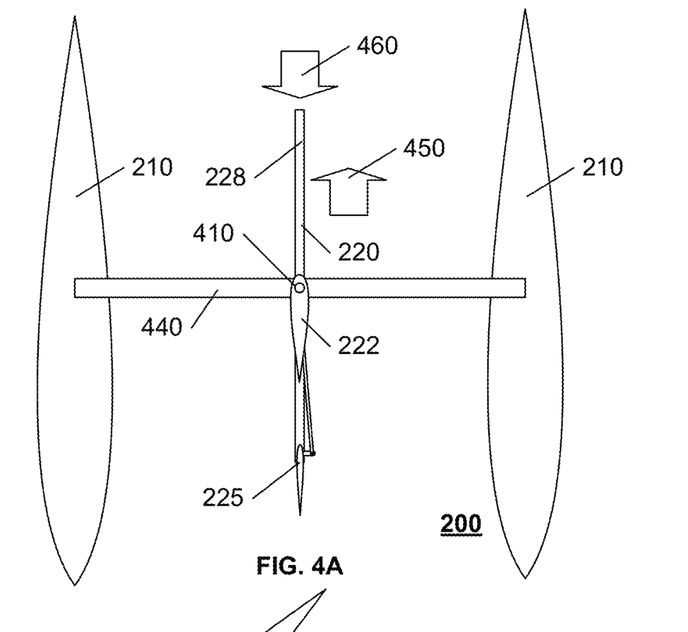
FIGS. 4A-4E illustrate an example autonomous sailboat with self-trimming capability.

In the example of FIG. 4A, the direction of travel 450 of the sailboat 200 is directly into (opposite of) the wind direction 460, such as may occur when the sailboat 200 is propelled forward by the auxiliary propulsion means (235 in FIG. 2A). In this state, with an angle of attack to the wind of zero, the wind will flow uniformly around both sides of the wingsail 222 and wind vane 225, resulting in a 'neutral', or 'zero-lift' state of the wingsail 222 that provides no lift to the sailboat 200.

If the wingsail structure 220 is offset slightly from the wind, a pressure gradient is produced on the wingsail 222 that produces a force toward the 'downwind', or leeward, side of the wingsail, as detailed further below. If the direction of travel 450 of the sailboat 200 is into the wind direction 460, as illustrated in FIG. 4A, the force induced by offsetting the wingsail 222 from the wind direction 460 will be exerted so as to push the sailboat 200 backwards, resulting in a drag that opposes the movement of the boat in the intended direction of travel 450.

In order to generate a lift that propels the sailboat 200 forward, the sailboat 200 must be steered in a direction that is at a non angle to the wind, and the sail must be trimmed to generate this lift from the movement of wind across its surface. Typically, sailboats can travel forward when the relative direction of the wind is greater than the minimum tacking angle, which varies based on the design of the sailboat, and is generally about 40-50°. At angles below the minimum tacking angle, into the wind, the pressure gradient produced is contrary to the direction of travel of the boat, producing a force component in the rearward direction of the sailboat, as mentioned above. At angles greater than the minimum tacking angle, the difference in the flow of the wind to the left and right of the wingsail 222 produces a force with a component in the forward direction of the sailboat, as detailed further below.

Figure 4B:
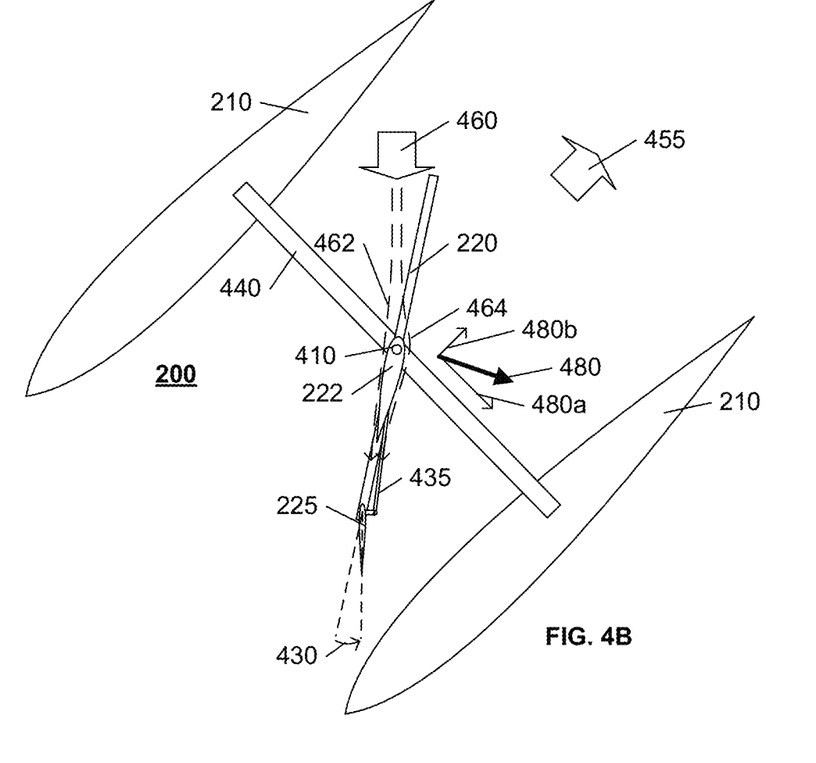

FIG. 4B illustrates a sailboat 200 that is traveling in a direction 455 that is at an angle to the wind direction 460. As illustrated by the dashed lines 462, 464, when the wind approaches the forward edge of the wingsail 222, it is diverted to the left and right of the wingsail 222. In this example, the wind 464 on the right (leeward) of the wingsail 222 curves around the forward edge of the wingsail 222 and travels along the leeward surface of the wingsail 222 toward the rear of the wingsail 222. The wind 462 on the left (windward) of the wingsail 222 travels along the windward surface of the wingsail 222 toward the rear of the wingsail. The pressure produced on the windward surface is greater than the pressure produced on the leeward surface, resulting in a force that is in a direction from the windward surface toward the leeward surface.

In the example of FIG. 4B, the force in the direction from the windward surface toward the leeward surface of the wingsail 222 is approximated by the arrow 480. Relative to the sailboat 200, this force 480 has a component 480a that pushes the sailboat 200 to the side, and a component 480b that pushes the sailboat 200 forward. The keel 230, being in the water, resist the movement of the sailboat 200 to the side, and is shaped to convert at least some of this force 480a into forward propulsion. The overall result of the wind's passage over the wingsail 222 is a forward propulsion of the sailboat 200 in the direction of travel 455, from the forward component 480b of the force of the wind 480 and the diversion of the sideway propulsion by the sideway component 480a by the hulls 210, and a remainder of the sideway propulsion of the sailboat in the leeward direction ('leeway'). This leeway is generally corrected by a minor change in the rudder angle to orient the sailboat 200 slightly more into the wind.

As noted above, the angle that the wingsail 222 is oriented relative to the wind direction 460 (angle of attack) determines the amount of lift that can be produced from the given wind speed and direction. For example, in FIG. 4B, if the wingsail 222 is rotated about the mast 410 in a counter-clockwise direction, decreasing the angle of attack and orienting the wingsail 222 more directly in line with the wind direction 460, the wind diversion to either side of the wingsail 222 will be more uniform, reducing the pressure gradient between the leeward and windward surfaces of the wingsail 222. Conversely, if the wingsail 222 of FIG. 4B is rotated about the mast 210 in a further clockwise direction, increasing the angle of attack, the leeward wind 464 may not be able to follow the curvature of the leading edge of the wingsail 222 around to the leeward surface, causing a stall, and a smooth flow over the leeward surface will not be achieved, reducing the pressure gradient between the leeward and windward surfaces.

The ideal angle of attack also varies as a function of the direction of travel 455 of the sailboat 220 relative to the wind direction 460. At a "close reach", with the direction of travel 455 near the minimum tacking angle ("close to the wind"), a narrow angle of attack provides better lift; at a "beam reach", with a direction of travel 455 near orthogonal to the wind direction ("abeam"), a wider angle of attack can be supported while maintaining a smooth flow over the leeward surface; and at a "broad reach", with a direction of travel 455 of about 135° relative to the wind direction 460, an even wider angle of attack can be supported. A wider angle of attack generally has the effect of increasing the forward component 480a of the force produced by the flow of the wind over the leeward surface of the wingsail 222; typically a sailboat achieves maximum speed when traveling on a beam reach or broad reach, depending upon the particular design of the sailboat.

The ideal angle of attack for a given wind direction relative to the direction of travel, or orientation of the boat relative to the wind direction (the "relative wind direction"), is primarily determined by the shape of the forward edge and the shape of the leeward surface of the wingsail 222. Accordingly, given a particular shape of the wingsail 222, if the relative wind direction can be determined, the wingsail 222 can be set to the corresponding ideal angle of attack for that relative wind direction.

The wind vane 225 of the example sailboat 200 facilitates a determination of the wind direction 460 relative to the direction of travel 455 of the sailboat. The wind vane 225 is pivoted on the wingsail structure 220 with minimal rotational friction. Accordingly, the wind vane 225 will consistently align itself with the direction of the wind 460, regardless of the orientation of the wingsail structure 220. As the angle 430 between the wind vane 225 and the wingsail structure 220 increases and decreases, a coupling rod 435 will transform this rotation into a substantially lateral movement relative to the truss 440, and correspondingly will provide a lateral movement relative to the orientation of the sailboat 200 based on the angle 430 of the wingsail structure 220 relative to the wind direction 460.

Alternatively stated, from a control viewpoint: a lateral movement of the coupling rod 435 relative to the truss 440 will control the rotation of the wind vane 225 relative to the wingsail structure 220. Because the wind vane 225 is constantly aligned with the wind direction 460, control of the rotation of the wind vane 225 relative to the wingsail structure 220 is effectively a control of the wingsail structure 220 relative to the wind direction 460. That is, lateral control of the coupling rod 435 effects a control of the angle of attack of the wingsail 222 to the wind direction 460.

In a manual/remote control of the angle of attack, an electrical actuator, such as an electromagnetic piston, may be adjusted to control the angle of attack by laterally moving the coupling rod 235. Typically, the angle of attack will be adjusted while monitoring the speed of the sailboat 220, and the preferred angle of attack is set at the angle that provides the maximum speed.

In accordance with an aspect of this invention, the sailboat 200 is configured to automatically control the angle of attack for a given relative wind direction. For example, the aforementioned electrical actuator can be computer-controlled to either achieve the maximum speed, as in the manual/remote control, or can be set to the aforementioned "ideal" angle of attack based on a determined relative wind direction, using, for example, a table of actuator settings for a variety of relative wind directions.

As noted above, however, electronic control of the sail-trim to achieve a desired angle of attack consumes electrical energy, whereas a mechanical control of the sail-trim does not. Further, the mechanical control may be the most responsive to instantaneous changes in wind, because the feedback loop, per se, is the control rod 435. In accordance with a further aspect of this invention, the coupling of the coupling rod 435 to the truss 440 mechanically varies the lateral position of the coupling rod 435 relative to the truss 440 as the direction of travel 455 (and correspondingly, the relative orientation of the sailboat 200) relative to the wind direction 460 changes.

Figures 4C, 4D, 4E:
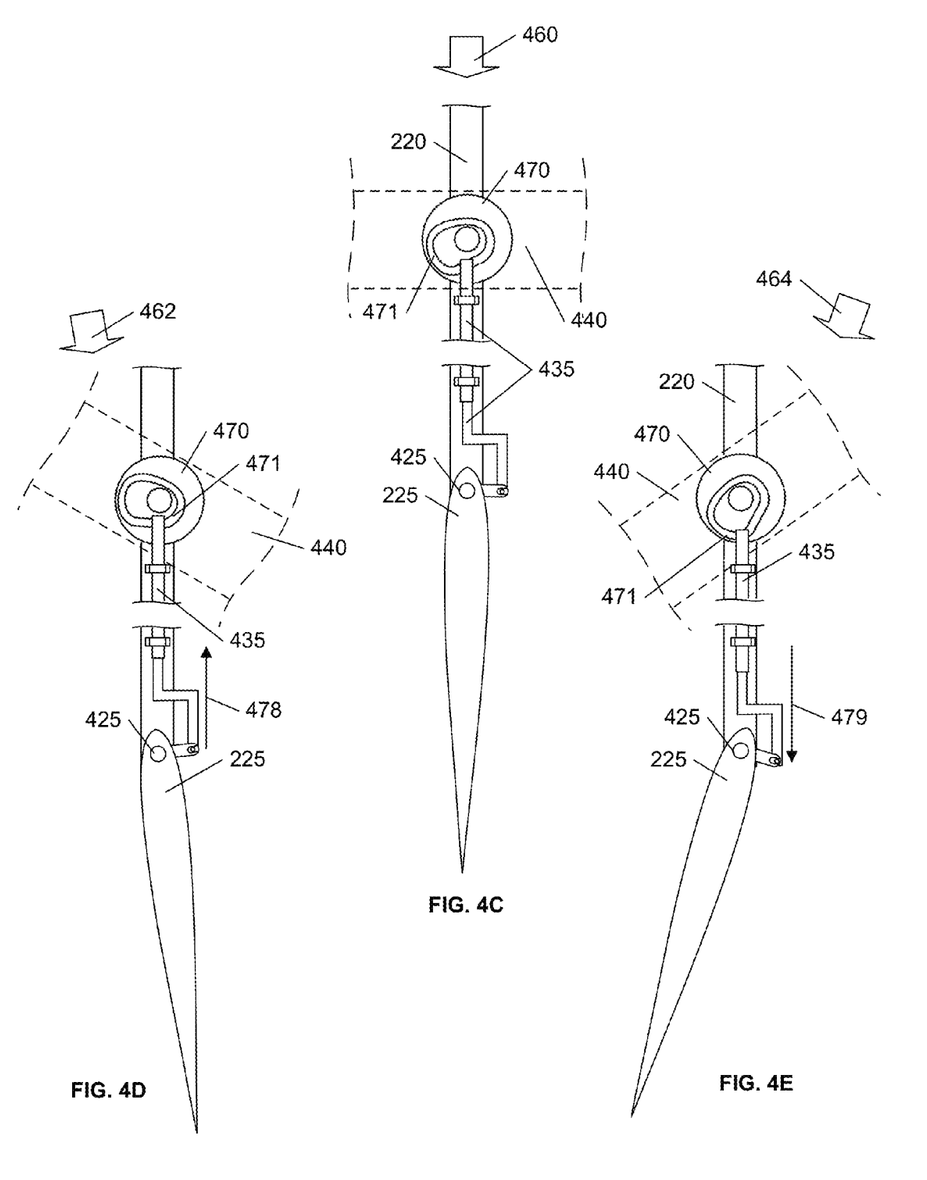

FIG. 4C illustrates a cam 470 that is fixedly attached to the truss 440, and thus fixedly attached to the sailboat 200. The coupling rod 435 includes a post that rides in the cam slot 471, and the cam slot 471 is shaped to effect a lateral movement of the coupling rod 435 as the truss 440 and attached cam 470 rotates relative to the wingsail structure 220; or, alternatively stated, effects a lateral movement of the coupling rod 435 as the wingsail structure 220 rotates relative to the orientation of the sailboat 200. That is, if the orientation of the sailboat 200 changes due to a change of course, or if a change in the wind direction 460 causes a change in the orientation of the wingsail structure 220 relative to the orientation of the sailboat 220, the cam 470 will effect a corresponding lateral change to the coupling rod 435, thereby changing the angle of attack of the wingsail 222 (not illustrated in FIGS. 4C-4E, for clarity of illustration) based on this change of wind direction 460 relative to the direction of travel of the sailboat 200.

As noted above, the ideal angle of attack can be determined for a given relative wind direction and a given shape of the wingsail 222. Accordingly, the cam slot 471 can be created to effect the lateral change to achieve the ideal angle of attack for all relative wind directions. That is, the shape of the cam is a mechanical embodiment of a control algorithm.

FIG. 4C illustrates an example cam 470 with cam slot 471 when the sailboat 200 and wingsail structure 220 are in the 'neutral' position relative to the direction of the wind, wherein the wingsail 222 and wind vane 225 are aligned with the wind direction 460. As can be seen, the cam slot 471 will introduce a substantially linear lateral movement of the coupling rod 435 as the cam 470 is rotated either clockwise or counter-clockwise via a rotation of the rigidly attached truss 440 (i.e. a change to the orientation of the sailboat relative to the neutral position, into the wind 460).

As illustrated in FIG. 4D, a clockwise rotation of the cam 470 will force the coupling rod 435 to travel toward the center of the cam 470, as indicated by the arrow 478, causing the wind vane 225 to rotate in the counter-clockwise direction about its pivot 425 on the wingsail structure 220. Because, with minimal rotation resistance, the wind vane 225 will continually align itself to the wind direction, this counter-clockwise rotation of the wind vane 225 relative to the wingsail structure 220 will offset the wingsail 222 relative to the wind direction 462 in a clockwise rotation, introducing an angle of attack that places the right surface of the wingsail 222 on the leeward side of the wind 462, similar to the orientation of the wingsail structure 220 relative to the sailboat 200 that is illustrated in FIG. 4B. This orientation of the right surface of the wingsail 222 on the leeward side of the wind 462 introduces a lift force with a forward component relative to the sailboat 200 and a leeway component to the right.

As illustrated in FIG. 4E, a counter-clockwise rotation of the cam 470 will force the coupling rod 435 to travel away from the center of the cam 470, as indicated by the arrow 479, introducing a clockwise rotation of the wind vane 225 about its pivot 425 on the wingsail structure 220. This clockwise rotation introduces a counter-clockwise rotation of the wingsail 222 relative to the wind direction 464, introducing an angle of attack of the wingsail 222 that places the left surface of the wingsail 222 on the leeward side of the wind. This orientation of the left surface of the wingsail 222 on the leeward side of the wind introduces a lift force with a forward component relative to the sailboat 200 and a leeway component to the left.

The lateral gradient provided by the cam slot 471 determines the angle of attack that is provided as the cam 470 (or sailboat 200) is rotated relative to the direction of the wind. As illustrated in FIGS. 4D and 4E, because the counter-clockwise rotation of the cam 470 in FIG. 4E is greater than the clockwise rotation of the cam 470 in FIG. 4D, the angle of attack of FIG. 4E is greater than the angle of attack of FIG. 4D. That is, the angle of attack based on the rotation of the cam 470 varies depending upon the degree of rotation, allowing the angle of attack to be controlled by the cam slot 471 so as to achieve the ideal angle of attack for all relative wind directions.

As also illustrated by the shape of the cam slot 471 in FIG. 4E, further counter-clockwise rotation of the cam 470 beyond the illustrated orientation will produce a very slight change in the lateral position of the coupling rod 435, consistent with an ideal angle of attack that extends across a wide range of relative wind directions. At some point, a further counter-clockwise rotation of the cam 470 will cause the coupling rod 435 to be drawn toward the center of the cam 470, reducing the angle of attack.

As the relative wind direction further increases, with the direction of travel being with the wind direction (sailing "downwind"), the wingsail structure 220 continues to rotate, placing the wingsail 222 forward of the truss 440. Eventually, the wingsail structure 220 may be aligned with the wind direction coming from the rear of the sailboat 200. Such an alignment will not produce a pressure differential, and correspondingly will not produce lift. As is known in the art of sailing, sailing directly downwind is not an efficient point of sail, even if the sail surface is oriented orthogonal to the wind, and sailing on alternate courses (tacks) in directions that are not directly downwind will generally provide a faster route to a downwind target. Accordingly, in an embodiment of this invention the navigation control system may be configured to avoid extreme downwind sailing, thereby avoiding an orientation of the wingsail 222 in line with the wind direction from the rear of the sailboat 200.

Alternatively, the cam slot 471 may be formed to provide a 'discontinuity', such that the wingsail structure 220 is constrained to a minimal angle of attack (positive or negative) when sailing downwind. At wind directions that would normally provide an angle of attack between the positive and negative minimal angles, the state of the cam is 'unstable', causing the coupling rod 235 to a position that produce either the positive or negative minimal angle of attack ('gybing' to one or the other tacks). In this manner, the wingsail will always present some resistance to the wind from behind the sailboat 200, causing forward propulsion.

Although the use of the above described mechanical self-trimming system is preferred for reducing energy consumption, a motor may also be provided to allow for direct control of the rotation of the wingsail structure 220 as needed. As noted above, for example, before initiation of the self-righting process, the wingsail structure 220 may need to be placed in a 'neutral' position with respect to a rotation about the mast 410, to avoid interference with other elements of the sailboat as the wingsail structure 220 is rotated about the axle 242, and a motor may be used to provide this controlled rotation about the mast 410.

Optionally, if a motor is provided to rotate the wingsail structure 220 about the mast 410, the motor may be used to provide other features. For example, the motor may be configured to serve as a generator as well. When in the mechanical self-trimming mode, variations in the wind, or variations in the angle of attack as the sailboat travels over waves, will cause random fluctuations of the wingsail structure 220 about the mast 410. If the motor is configured as a generator, these fluctuations about the mast 410 will produce electrical energy that can be used or stored. Additionally, because the generator introduces an inertial resistance that is proportional to its load, the load can be controlled so as to introduce a desired amount of damping to the fluctuations, to provide a more stabilized travel and to reduce the wear and tear caused by excessive fluctuations.

In any event, regardless of the relative wind direction and provided angle of attack, the navigation control system of the sailboat 200 is preferably configured to activate the auxiliary propulsion system 235 if it is determined that the sailboat 200 is not making sufficient progress toward the target area, or is traveling beyond its designated surveillance region. During these periods, the aforementioned use of a generator that generates electricity as the wingsail structure 220 fluctuates about the mast 410 may be used to replenish some of the energy consumed by the auxiliary propulsion system 235 and dampen the fluctuations, particularly if the winds are variable, or the seas are rough.

Figure 5:
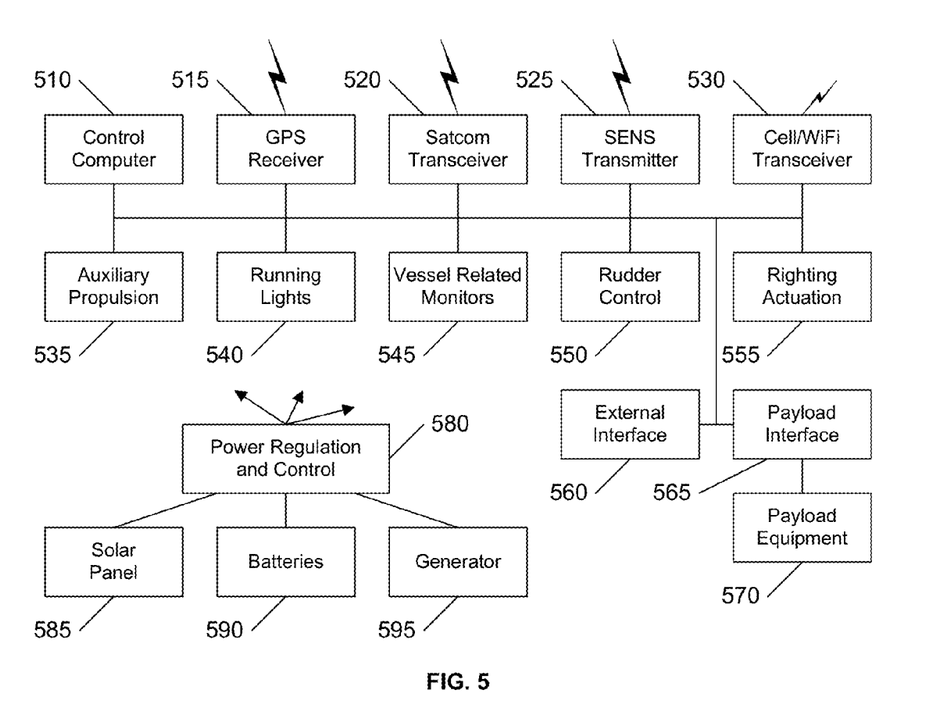
FIG. 5 illustrates an example block diagram of the communications and control systems of an example autonomous sailboat.

FIG. 5 illustrates an example block diagram of the communications, control, and monitoring systems of an example autonomous sailboat.

A control computer 510 primarily coordinates the operation of the equipment on the sailboat, although some of the equipment may operate autonomously or semi-autonomously. For example, in some embodiments, all external communications are controlled by the computer 510, while in other embodiments, devices send and receive messages directly to and from the individual communication devices. In like manner, the degree of interaction and control of the payload mission specific monitoring exercised by the control computer 510 may vary, depending upon the particular mission and/or the particular type of monitoring.

Although illustrated as a single block, the control computer 510 may include multiple processing systems, including, for example, redundant systems for fail-safe operation and/or embedded systems customized for particular tasks, such as navigation. The operation of the control computer 510 may best be understood in the context of the equipment on board with which the computer 510 interacts, as follows.

A fundamental piece of equipment for the autonomous sailboat is a GPS receiver 515 that receives messages from a plurality of satellites, from which the latitude and longitude of the receiver 515 (and thus the location of the sailboat) is determined. Depending upon the capabilities of the GPS receiver 515, other information, such as the speed and direction of travel, may also be provided; or, another element, such as the control computer 510 may determine the speed and direction of travel from the reported locations over time. This information is provided on the communications bus 501 for use by any of the devices on this bus 501. As noted above, the control computer 510 may use the current location of the sailboat to determine a route to a target area, may use the speed and direction of travel information to trim the rudder to compensate for drift, and so on. The location information may also be included in each of the monitoring messages that are transmitted from the sailboat.

Another fundamental piece of equipment for the autonomous sailboat is a communication device for reporting the monitored information. In the example of FIG. 5, a plurality of satellite communication devices 520, 525 are provided, although fewer or more communication devices may be provided. The example satellite communication (Satcom) transceiver 520 is a conventional satellite messaging system, such an Iridium transceiver. The transceiver 520 receives messages that are addressed to the sailboat and provides these messages on the bus 501. A particular sailboat may have multiple addresses, such as an address for receiving sailboat related messages (e.g. navigation messages) and another address for receiving payload related messages (e.g. monitor control messages); alternatively, all messages may be addressed to a single address and a message protocol may be established for distinguishing the received messages. In some configurations, groups of sailboats are assigned a common address for receiving 'fleet' or 'sub-fleet' related communications. The control computer 510 may be configured to receive and process the messages for communicating specific information to particular devices, and/or some of the devices may be configured to receive and process particular messages directly.

In like manner, messages may be transmitted from the sailboat via the transceiver 520. These messages may be formatted by the control computer 510 based on information received from devices on the sailboat, or some devices may be configured to provide messages directly to the transceiver 520. The messages may be addressed to a common address, relying on the receiver at that address to route the messages to the appropriate recipients, and/or different addresses may be used to directly communicate particular messages to particular recipients.

The ability to use a commercial satellite communication system for transmitting and receiving messages provides substantial flexibility in the form and content of the messages. Custom formats may be defined for these communications, using, for example, HTML schemas. In some embodiments, a mix of custom and standard formats may be used. For example, the National Marine Electronics Association (NMEA) provides a protocol standard, NMEA 2000, that is used for communicating navigation, control, monitoring, and other information among marine devices. The control computer 510 may be configured, for example, to send and receive NMEA formatted messages from and to the on-shore monitor and control station (150 of FIG. 1) via the transceiver 520.

The flexibility provided by the use of a conventional satellite messaging system, however, may require a substantial use of resources on the sailboat, and may incur a significant monetary cost for accessing this service. Of particular note, before each message can be sent or received, a synchronous link must be established with the satellite, and this link must be maintained for the duration of the message. Further, each sailboat in the fleet is 'competing' with each other sailboat for a satellite channel for establishing the synchronous link. The creation, transmission, reception and decoding, of these messages consume electrical energy, and, after the electrical propulsion system, may be the largest consumer of electrical energy on the sailboat.

Optionally, a low power, limited capability satellite communication system may be used for communicating routine information. For example, the Sensor Enabled Notification System (SENS) is specifically designed to efficiently communicate monitored information. In the example of FIG. 5, a SENS transmitter (or a SENS transceiver) 525 is used for communicating some of the monitored information, thereby off-loading the task of communicating this information via the higher power-consuming transceiver 520.

The SENS transmitter 525 transmits relatively short messages (about 80 bytes) periodically and/or when a reporting event is triggered. These messages typically include an identifier of the transmitter 525, the current GPS location, and parameter values reported from one or more sensors/monitors. The SENS transmitter 525 broadcasts each message autonomously, without requiring an establishment of a synchronous link with the satellite system, thereby saving a substantial amount of the time and energy typically required for satellite communications. Because the SENS messages use a fixed format, the creation of these messages can be optimized, further reducing the time and resources consumed for each message.

In an example embodiment, the SENS transmitter 525 may be used as the primary source of location and sensor data, and the satcom transceiver 520 only used when required as the situation demands. For example, the satcom transceiver 520 may be used to receive a command to travel to a target area, and all of the messages sent by the sailboat on the way to the target area are sent via the SENS transmitter 525. In like manner, while in the target area, periodic location and sensor messages are sent via the SENS transmitter 525, and information from other monitors may be communicated via the satcom transceiver 520 when particular events occur.

Other communication systems may also be used in lieu of the satcom transceiver 520. For example, when traveling along the coast or on inland waterways, a cell-phone transceiver or WiFi transceiver 530 may be used. In some embodiments, the WiFi transceiver 530 is used to couple the computer 510 to a network for receiving configuration and other information before being deployed, and/or for testing the equipment on the sailboat before each deployment. Other means for communicating with equipment on the sailboat will be evident to one of skill in the art in view of this disclosure.

FIG. 5 also illustrates common equipment 535-555 used to control the sailboat. Additional, or alternative, equipment will be evident to one of skill in the art.

The auxiliary propulsion equipment 535 provides forward and reverse propulsion on demand, primarily when the wingsail is unable to achieve sufficient progress toward the target area, unable to maintain location in an assigned area, or when 'weather-independent' control is required, such as in high-traffic areas.

The running lights 540 are provided primarily for use in high-traffic areas, and include a set of red, green, and white running lights.

A variety of vessel-related monitors 545 are provided for determining the status of the sailboat and its environment. These monitors 545 may include, for example, a wind direction and speed monitor, a speed-thru-water transducer, voltage and current monitors, inertial monitors, a wingsail orientation monitor, a rudder orientation monitor, heeling-angle monitor, compass heading monitor, and so on.

A rudder control system 550 controls the orientation of the rudder to maintain a given course, change course, correct for drift, and so on.

The righting actuation system 555 includes the actuator(s) required to implement the above described self-righting capability. The actuator may be controlled by commands from the control computer 510, or the system 555 may include the necessary electronics to autonomously execute the righting and heeling-correcting operations described above, based on a reported or determined heeling angle.

Optionally, an external interface 560 may be provided, primarily for configuring and testing the equipment during development and before and after each deployment.

As noted above, the sailboat is intended to convey mission-specific payload equipment 570 to a target area; this payload equipment 570 typically includes a collection of monitoring devices, such as cameras, transducers, and the like, although other types of devices may be deployed. For example, a loudspeaker system may be provided for making announcements under certain situations, such as when a vessel is detected near a restricted area; a microphone system may also be provided for two-way vocal communications.

To integrate the payload system into the sailboat control system, a payload interface 565 is provided. This interface may be used for communicating any monitoring commands received from the transceiver 520, communicating monitored information to the control computer 510, or directly to the transceivers 520, 525.

To provide power to the various equipment on the sailboat, a power regulation and control system 560 receives power from a variety of sources, and provides the required power to each of the components of the sailboat. Not illustrated, each of the compartments 260 of the sailboat 200 of FIG. 2A are pre-wired to provide access to power from the system 560, as well as access to the data bus 501 or other onboard networks. In some embodiment, a priority scheme is used to assure that critical equipment are provided power as required. For example, if the available power is diminished, some equipment may be disabled, while critical equipment, such as the rudder control and righting actuation systems remain enabled.

The power control system 560 receives energy from the solar panels 585 that are mounted on the sailboat, and a battery system 590 stores some of this energy to provide power when the solar panels 585 are not generating electricity. Optionally, the electric propulsion equipment (235 of FIG. 2A) may be configured to include a generator that generates electricity when the wingsail propels the sailboat. Preferably, the electric propulsion system provides minimal resistance while the sailboat is sailing at low speeds, and provides the generator load only when the lift produced is sufficient to support this load while still maintaining a given minimal speed.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the sailboat is designed to survive collisions with larger vessels, the sailboat may be configured to include an AIS (Automatic Identification System) receiver that receives location information transmitted by commercial vessels and other vessels equipped with an AIS transceiver. To avoid collisions, the control computer 510 may be configured to temporarily adjust the direction of travel based on the received AIS information. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

I claim:

1. A sailboat comprising:
a plurality of hulls arranged parallel to each other and coupled together by a truss arrangement, a wingsail structure that is rotatable about a first axis of rotation that is orthogonal to a plane of the hulls, and a second axis of rotation that is parallel to the hulls, and an auto-righting system that is configured to rotate the wingsail structure about the second axis of rotation when a capsize of the sailboat is detected.

2. The sailboat of claim 1, wherein the wingsail structure includes a buoyancy element that serves to facilitate righting of the sailboat when the auto-righting system rotates the wingsail structure.

3. The sailboat of claim 2, wherein the buoyancy element includes a wingsail.

4. The sailboat of claim 3, wherein the buoyancy element includes a flotation bulb above the wingsail.

5. The sailboat of claim 1, including a keel that is rotatable about a keel axis of rotation that is parallel to the hulls.

6. The sailboat of claim 5, wherein the keel is fixedly attached to the wingsail structure, and the keel axis of rotation corresponds to the second axis of rotation.

7. The sailboat of claim 1, including a control system that detects whether a capsize has occurred, and activates the auto-righting system when the capsize is detected.

8. The sailboat of claim 7, wherein the control system detects a heeling angle and activates the auto-righting system before the capsize is detected, based on the detected heeling angle.

9. The sailboat of claim 1, including one or more solar panels that provide the energy required to enable the auto-righting system.

10. The sailboat of claim 1, including a rudder, and a navigation control system that controls an orientation of the rudder to create a direction of travel of the sailboat toward a target area.

11. The sailboat of claim 1, wherein the wingsail structure includes a wingsail that provides lift to propel the sailboat forward.

12. The sailboat of claim 11, wherein the wingsail structure includes a wind vane that pivots on the wingsail structure so as to consistently be aligned with a current wind direction.

13. The sailboat of claim 12, wherein the wingsail structure includes a balance element that facilitates the rotation of the wingsail structure about the first axis of rotation.

14. The sailboat of claim 12, including a coupling rod that controls a difference between an orientation of the wingsail structure and an orientation of the wind vane.

15. The sailboat of claim 14, wherein the truss structure includes a cam coupled to the coupling rod to control the difference between the orientation of the wingsail structure and the orientation of the wind vane based on an orientation of the truss structure.

16. The sailboat of claim 15, wherein the cam includes a cam slot that is shaped to provide a desired angle of attack of the wingsail based on the orientation of the truss structure.

17. The sailboat of claim 1, including one or more watertight compartments for installation of monitoring equipment.

18. The sailboat of claim 17, including one or more communication systems for communicating information from the monitoring equipment to a remote monitoring station.

19. The sailboat of claim 18, wherein the one or more communication systems include a satellite transceiver.

20. The sailboat of claim 19, wherein the one or more communication systems include a SENS transmitter.

21. The sailboat of claim 1, including a motor that controls rotation of the wingsail structure about the first axis of rotation.

22. The sailboat of claim 21, wherein the motor may be configured as a generator that generates energy as the wingsail structure fluctuates about the first axis of rotation.

23. A sailboat comprising:
a plurality of hulls arranged parallel to each other and coupled together by a truss arrangement,
a wingsail structure that is rotatable about a first axis of rotation that is orthogonal to a plane of the hulls, and
an autotrim system that controls rotation of the wingsail structure about the first axis of rotation;
wherein:
the wingsail structure includes:
a wingsail that provides lift to propel the sailboat forward,
a wind vane that pivots on the wingsail structure so as to consistently be aligned with a current wind direction, and
a coupling rod that controls a difference between an orientation of the wingsail structure and an orientation of the wind vane; and
the autotrim system includes a cam attached to the truss arrangement and coupled to the coupling rod to control the difference between the orientation of the wingsail structure and the orientation of the wind vane based on an orientation of the truss structure.

24. The sailboat of claim 23, wherein the wingsail structure includes a balance element that facilitates the rotation of the wingsail structure about the first axis of rotation.

25. The sailboat of claim 23, wherein the cam includes a cam slot that is shaped to provide a desired angle of attack of the wingsail based on the orientation of the truss structure.

26. The sailboat of claim 23, including a motor that controls rotation of the wingsail structure about the first axis of rotation.

27. The sailboat of claim 24, wherein the motor may be configured as a generator that generates energy as the wingsail structure fluctuates about the first axis of rotation.

28. A method of righting a capsized sailboat in a body of water comprising rotating a buoyant mast structure about an axis that is parallel to a surface of the body of water, so as to move a center of buoyancy of the capsized sailboat away from a center of gravity of the capsized sailboat, thereby introducing a righting torque.

29. A method of self-trimming a sailboat comprising:
providing a wingsail structure that provides lift to the sailboat at a given angle of attack;
providing a windvane structure the indicates a direction of wind relative to the sailboat;
coupling the wingsail structure and the windvane structure via a cam that controls the angle of attack of the wingsail based on the direction of wind indicated by the windvane structure.

30. The method of claim 29, wherein the cam is rigidly affixed to the sailboat, such that its relative orientation is consistent with an orientation of the sailboat, and is coupled to the windvane structure such that a rotation of the windvane structure causes the wingsail structure to rotate relative to the orientation of the sailboat.

* * * * *